United States Patent [19]
Schifferl et al.

[11] Patent Number: 5,616,843
[45] Date of Patent: Apr. 1, 1997

[54] METHOD AND CIRCUIT CONFIGURATION FOR PROTECTING A HEATED TEMPERATURE-DEPENDENT SENSOR RESISTOR AGAINST OVERHEATING

[75] Inventors: Ludwig Schifferl, Pentling; Andreas Wildgen, Nittendorf, both of Germany

[73] Assignee: Siemens Aktiengesellschaft, Munich, Germany

[21] Appl. No.: 622,553

[22] Filed: Mar. 25, 1996

Related U.S. Application Data

[63] Continuation of PCT/DE94/01083 Sep. 19, 1994 published as WO95/08753 Mar. 30, 1995.

[30] Foreign Application Priority Data

Sep. 23, 1993 [DE] Germany .................... 43 32 412.6

[51] Int. Cl.⁶ ...................................................... G01F 1/68
[52] U.S. Cl. ...................... 73/204.15; 374/173; 73/118.2
[58] Field of Search ............................ 73/204.15, 204.13, 73/204.18, 204.19, 118.2; 374/54, 173, 183, 185

[56] References Cited

U.S. PATENT DOCUMENTS

| | | | |
|---|---|---|---|
| Re. 33,076 | 10/1989 | Sugiura | 73/204.15 |
| 4,854,167 | 8/1989 | Czarnocki et al. | 73/204.19 |
| 4,938,061 | 7/1990 | Carp | 73/204.19 |
| 4,947,057 | 8/1990 | Czarnocki et al. | 307/310 |
| 5,181,420 | 1/1993 | Suzuki et al. | 73/204.15 |

FOREIGN PATENT DOCUMENTS

| | | |
|---|---|---|
| 2042983 | 8/1978 | Germany . |
| 3022685 | 1/1982 | Germany . |
| 3207394 | 9/1983 | Germany . |
| 3932304 | 4/1991 | Germany . |

OTHER PUBLICATIONS

Patent Abstracts of Japan, vol. 9, No. 329 (P–416) [2052] Dec. 24, 1985.
Patent Abstracts of Japan, vol. 12, No. 48 (P–666) [2895] Feb. 13, 1988.

*Primary Examiner*—Richard Chilcot
*Assistant Examiner*—Jewel V. Artis
*Attorney, Agent, or Firm*—Herbert L. Lerner; Laurence A. Greenberg

[57] ABSTRACT

A temperature detector resistor and a sensor resistor are disposed in an intake manifold of an internal combustion engine. The two resistors each belong to a respective bridge branch of a measuring bridge having a bridge diagonal which is led to a first differential amplifier. A current in the bridge is adjusted in such a way that the sensor resistor always has a prescribed overtemperature. Due to backfires in the intake manifold, damage can occur to the sensor resistor due to sudden strong heating of the temperature detector resistor as a consequence of a strong rise in current. In order to avoid such damage, a third bridge branch is connected in parallel with the two bridge branches. The third bridge branch has a tap which is supplied, as is another tap, to inputs of a second differential amplifier having an output signal influencing the bridge current in such a way that the current is limited to a prescribed value. The device is applicable in internal combustion engines.

5 Claims, 2 Drawing Sheets

METHOD AND CIRCUIT CONFIGURATION FOR PROTECTING A HEATED TEMPERATURE-DEPENDENT SENSOR RESISTOR AGAINST OVERHEATING

CROSS-REFERENCE TO RELATED APPLICATION

This application is a Continuation of International Application Serial No. PCT/DE94/01083, filed Sep. 19, 1994.

BACKGROUND OF THE INVENTION

Field of the Invention

The invention relates to a method for protecting a heated temperature-dependent sensor resistor against overheating, which includes connecting the sensor resistor in a first bridge branch of a bridge circuit for measuring a drawn-in air mass in an intake manifold of an internal combustion engine; connecting a resistor as an air temperature detector in a second bridge branch of the bridge circuit; and controlling a bridge current through a first circuit for keeping a prescribed bridge diagonal voltage constant and for serving as a measure of the drawn-in air mass.

The invention also relates to circuit configuration for measuring a drawn-in air mass in an intake manifold of an internal combustion engine, including a heated temperature-dependent sensor resistor connected in a first bridge branch of a bridge circuit; a resistor disposed in a second bridge branch as an air temperature detector; a first differential amplifier and a circuit controlling a bridge current as a measure of the drawn-in air mass for keeping a prescribed bridge diagonal voltage constant; a third bridge branch connected in parallel with the first bridge branch as a voltage divider; and a second differential amplifier having inputs connected to center taps of the first and third bridge branches, as well as a further circuit.

Such a method is disclosed in German Published, Non-Prosecuted Patent Application DE 32 07 394 A1, corresponding to U.S. Pat. No. 4,462,251. There, the sensor resistor is protected against overheating, although only during burn-off operations for removing deposits.

An appropriate circuit configuration is disclosed in German Published, Non-Prosecuted Patent Application DE 30 22 685 A1, corresponding to U.S. Pat. No. 4,420,971, where a precise setting of a specific wire temperature is undertaken, likewise by burning off an air mass meter, with a circuit configuration having three bridge branches and two differential amplifiers, in which configuration a maximum prescribed sensor temperature of the sensor resistor is not exceeded.

The construction and the mode of operation of thermal air mass meters is generally known, for example from German Patent 20 42 983. That device is described in greater detail below with regard to FIG. 3.

Conventional air mass meters normally have a certain inertia, so that backfires in the intake manifold do not have a damaging influence on the sensor resistor. However, because of increased technical requirements, quickly reacting air mass meters are being used more and more. If backfires occur in the intake manifold, the differential amplifier attempts to correct the bridge which has been detuned thereby on the basis of heating of the temperature detector, and that can lead to overheating and thus to damage to the sensor resistor.

SUMMARY OF THE INVENTION

It is accordingly an object of the invention to provide a method and a circuit configuration for protecting a heated temperature-dependent sensor resistor against damage by overheating, which overcomes the hereinafore-mentioned disadvantages of the heretofore-known methods and devices of this general type.

With the foregoing and other objects in view there is provided, in accordance with the invention, a method for protecting a heated temperature-dependent sensor resistor against overheating, which comprises connecting a sensor resistor in a first bridge branch of a bridge circuit for measuring a drawn-in air mass in an intake manifold of an internal combustion engine; connecting a resistor as an air temperature detector in a second bridge branch of the bridge circuit; controlling a bridge current through a first circuit for keeping a prescribed bridge diagonal voltage constant and for serving as a measure of the drawn-in air mass; connecting a third bridge branch in parallel with the first bridge branch and tuning the third bridge branch in a ratio of the sensor resistor and another resistor of the first bridge branch at a maximum permissible temperature of the sensor resistor; supplying respective voltages at center taps of the first and third bridge branches to a second circuit; and using the voltages in the second circuit to reduce a bridge current through the first circuit if the maximum permissible temperature of the sensor resistor is reached in the event of a sudden strong heating of the resistor of the air temperature detector.

With the objects of the invention view, there is also provided a circuit configuration for measuring a drawn-in air mass in an intake manifold of an internal combustion engine, comprising a bridge circuit having a first branch with a center tap and a resistor, a second branch, and a third branch with a center tap; a heated temperature-dependent sensor resistor connected in the first bridge branch; a resistor connected in the second bridge branch as air temperature detector; a first differential amplifier and a first circuit controlling a bridge current as a measure of a drawn-in air mass for keeping a prescribed bridge diagonal voltage constant; the third bridge branch being connected in parallel with the first bridge branch as a voltage divider; a second differential amplifier having inputs being connected to the center taps of the first and third bridge branches; the third bridge branch being tuned in a ratio of the resistors of the first bridge branch in the case of a maximum permissible temperature of the sensor resistor; and a second circuit connected to the second differential amplifier for reducing a bridge current due to input voltages of the second differential amplifier, if the maximum permissible temperature of the sensor resistor is reached in the event of sudden strong heating of the resistor of the air temperature detector.

In accordance with another feature of the invention, there is provided a circuit element controlling the current of the bridge circuit, the second differential amplifier having an output, and the second circuit having a transistor with a gate terminal connected to the output terminal of the second differential amplifier and a collector-emitter path connected to the circuit element controlling the current of the bridge circuit.

In accordance with a further feature of the invention, the first differential amplifier has an input, the second differential amplifier has an output, and the second circuit includes a connection of the output of the second differential amplifier to the input of the first differential amplifier.

In accordance with a concomitant feature of the invention, the connection of the output of the second differential amplifier to the input of the first differential amplifier includes a circuit element determining a current direction.

Through the use of the measures according to the invention, the current through the sensor resistor is limited in the event of backfires in the intake manifold in such a way that they do not lead to damaging effects on the sensor resistor.

Other features which are considered as characteristic for the invention are set forth in the appended claims.

Although the invention is illustrated and described herein as embodied in a method and a circuit configuration for protecting a heated temperature-dependent sensor resistor against overheating, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
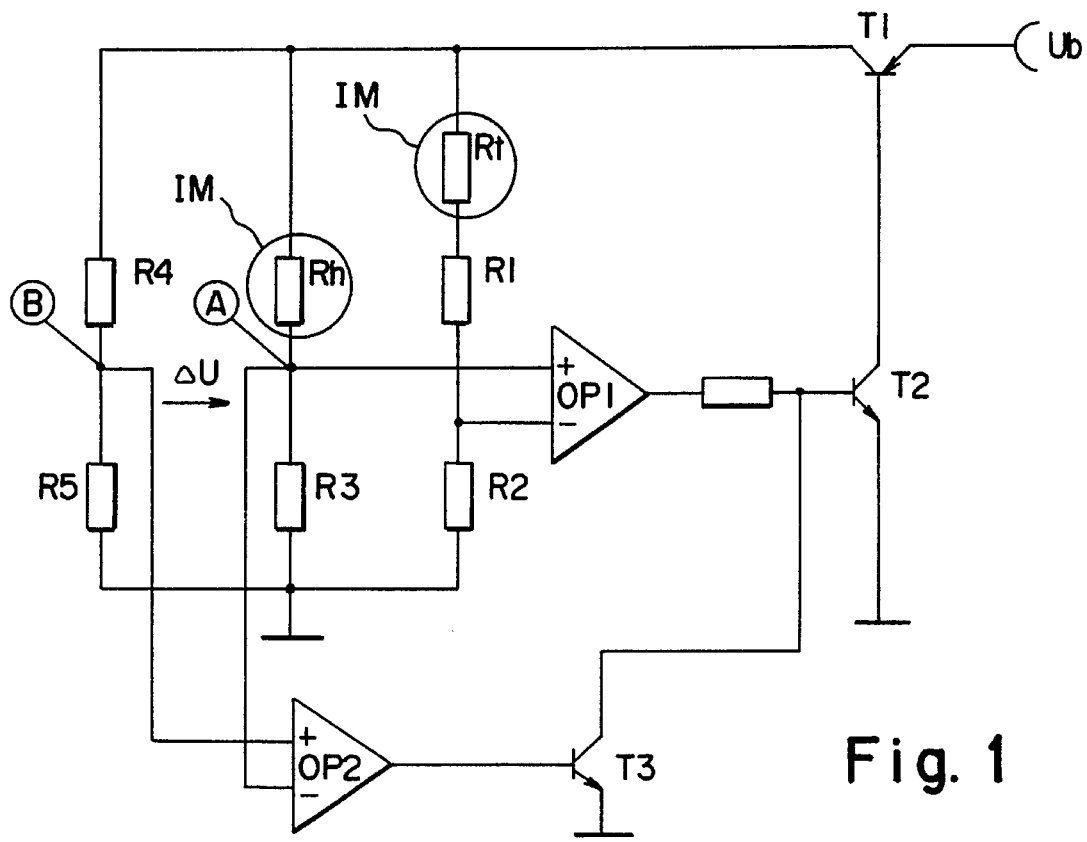
FIG. 1 is a schematic circuit diagram of a first embodiment of the invention.

Referring now to the figures of the drawings in detail and first, particularly, to FIG. 1 thereof, there is seen a circuit configuration which illustrates a known measuring principle and which includes a measuring bridge with a first and a second bridge branch and a differential amplifier with an associated circuit. A temperature-dependent sensor resistor, such as a hot-film resistor Rh, as well as a resistor R3 in series therewith, are located in the first bridge branch. A temperature-dependent high-resistance resistor Rt, which serves as a quickly responding temperature detector and detects the temperature of the drawn-in air, is located in the second bridge branch. Resistors R1 and R2 are connected in series with the resistor Rt. The sensor resistor Rh and the resistor Rt are disposed in an intake manifold or inlet tract IM of an internal combustion engine.

The bridge is supplied with voltage from a voltage source Ub through a first transistor T1 at a point D. A bridge point E is connected to ground, which may be the frame or chassis. A bridge diagonal of the bridge is formed by a tap point A between the resistors Rh and R3 and a tap point C between the resistors R1 and R2. The two tap points A and C are connected to input terminals of a differential amplifier OP1 having an output which is led through a resistor to a base of a further transistor T2. The further transistor T2 has a collector-emitter path which is connected, on one hand, to a base of the first transistor T1 and, on the other hand, to ground or the frame or chassis. The magnitude of the resistors Rt, R1 and R2 is selected in such a way that a power loss of the temperature-dependent resistor Rt, which is generated by a bridge branch current flowing through it, is so small that the temperature of the resistor Rt virtually does not vary with changes in a bridge voltage but always corresponds to a temperature of drawn-in air flowing past. The intention is for the bridge to be in the balanced state at a temperature which corresponds approximately to a average air temperature.

The temperature-dependent sensor resistor Rh is heated, through the voltage source Ub, up to a value at which a bridge diagonal voltage UAC vanishes or assumes a prescribed value. The output of the differential amplifier OP1 in this case determines which current flows into the bridge circuit. If, due to changes in the amount of drawn-in air, there is a variation in the temperature of the sensor resistor Rh, there is a variation in the voltage UAC across the bridge diagonal, and the differential amplifier OP1 controls the bridge supply current through the transistors T1, T2 to a value for which the bridge is rebalanced or detuned in a prescribed way. The output of the differential amplifier OP1 or the current through the resistor R3 is then a measure of the quantity of the drawn-in air.

Figure 2:
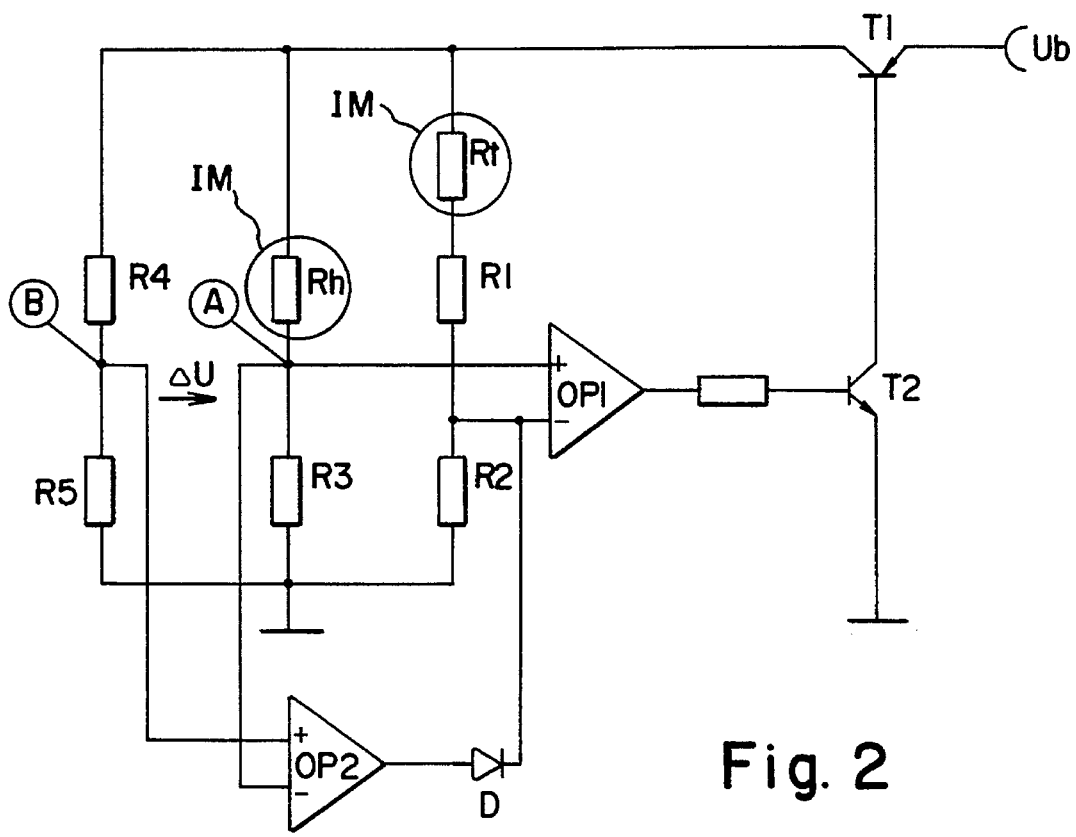
FIG. 2 is a schematic circuit diagram of a second embodiment of the invention.
Figure 3:
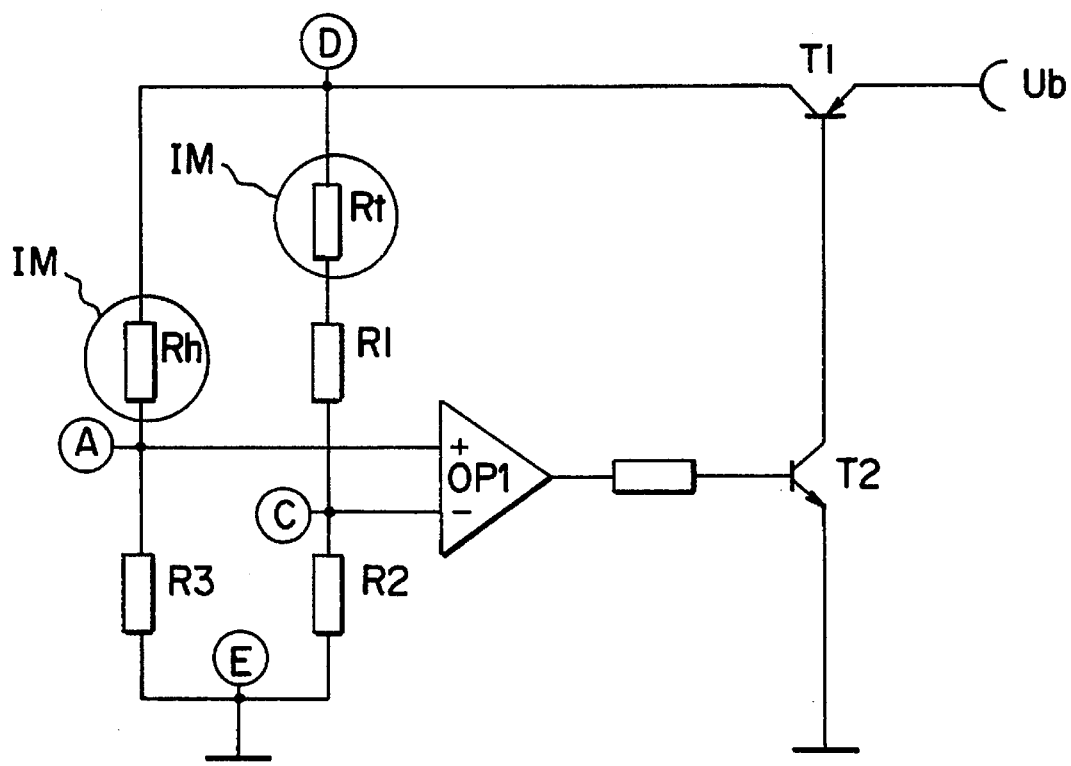
FIG. 3 is a schematic diagram of a circuit configuration according to the prior art.

FIGS. 1 and 2 show circuit elements which are identical to those in FIG. 3 and therefore are provided with the same reference symbols. As a glance at FIG. 1 shows, the first and second bridge branches, the differential amplifier OP1 and the transistors T1 and T2 are identical to the configuration shown in FIG. 3. A third bridge branch, which is connected in parallel with the first bridge branch, includes resistors R4 and R5, between which a tap B is formed. The tap A of the first bridge branch and the tap B are each led to a respective input terminal of a second differential amplifier OP2 having an output which is led to a base of a further transistor T3. An emitter of the transistor T3 is connected to ground or the frame or chassis. A collector of the transistor T3 of a second circuit is connected to a base of the transistor T2 of a first circuit.

The configuration operates as follows. It may be assumed, firstly, that a resistance ratio R4/R5 corresponds to a ratio Rh/R3 in the case of a maximum permissible absolute temperature Tmax of the resistor Rh, that is to say R4/R5=Rh(Tmax)/R3.

A voltage ΔU between the taps B and A is therefore positive as soon as the sensor resistance Rh exceeds a specific absolute temperature. The voltage difference is evaluated by the second differential amplifier OP2. The second differential amplifier OP2 issues an output signal which acts on the base of the transistor T3 in such a way that the latter limits the base current of the transistor T2 in such a way that the permissible sensor temperature is not exceeded.

The circuit configuration according to FIG. 2 exhibits the same construction as the circuit configuration according to FIG. 1, with the exception that the output terminal of the differential amplifier OP2 is led through a diode D of the second circuit to an inverting input of the first differential amplifier OP1. In the event of the occurrence of a voltage difference ΔU, the output signal of the differential amplifier OP2 raises the inverting input of the differential amplifier OP1 through the diode D. As a result, the differential input voltage at the differential amplifier OP1 becomes smaller and thus the desired limitation of current and temperature is achieved.

We claim:

1. A method for protecting a heated temperature-dependent sensor resistor against overheating, which comprises:

connecting a sensor resistor in a first bridge branch of a bridge circuit for measuring a drawn-in air mass in an intake manifold of an internal combustion engine;

connecting a resistor as an air temperature detector in a second bridge branch of the bridge circuit;

controlling a bridge current through a first circuit for keeping a prescribed bridge diagonal voltage constant and for serving as a measure of the drawn-in air mass;

connecting a third bridge branch in parallel with the first bridge branch and tuning the third bridge branch in a ratio of the sensor resistor and another resistor of the first bridge branch at a maximum permissible temperature of the sensor resistor;

supplying respective voltages at center taps of the first and third bridge branches to a second circuit; and using the voltages in the second circuit to reduce a bridge current through the first circuit if the maximum permissible temperature of the sensor resistor is reached in the event of a sudden strong heating of the resistor of the air temperature detector.

2. A circuit configuration for measuring a drawn-in air mass in an intake manifold of an internal combustion engine, comprising:

a bridge circuit having a first branch with a center tap and a resistor, a second branch, and a third branch with a center tap;

a heated temperature-dependent sensor resistor connected in said first bridge branch;

a resistor connected in said second bridge branch as air temperature detector;

a first differential amplifier and a first circuit controlling a bridge current as a measure of a drawn-in air mass for keeping a prescribed bridge diagonal voltage constant;

said third bridge branch being connected in parallel with said first bridge branch as a voltage divider;

a second differential amplifier having inputs being connected to said center taps of said first and third bridge branches;

said third bridge branch being tuned in a ratio of said resistors of said first bridge branch in the case of a maximum permissible temperature of said sensor resistor; and a second circuit connected to said second differential amplifier for reducing a bridge current due to input voltages of said second differential amplifier, if the maximum permissible temperature of said sensor resistor is reached in the event of sudden strong heating of said resistor of said air temperature detector.

3. The circuit configuration according to claim 2, including a circuit element controlling the current of said bridge circuit, said second differential amplifier having an output, and said second circuit having a transistor with a gate terminal connected to the output terminal of said second differential amplifier and a collector-emitter path connected to said circuit element controlling the current of said bridge circuit.

4. The circuit configuration according to claim 2, wherein said first differential amplifier has an input, said second differential amplifier has an output, and said second circuit includes a connection of said output of said second differential amplifier to said input of said first differential amplifier.

5. The circuit configuration according to claim 4, wherein said connection of said output of said second differential amplifier to said input of said first differential amplifier includes a circuit element determining a current direction.

* * * * *